US009474065B2

(12) United States Patent
Wang et al.

(10) Patent No.: US 9,474,065 B2
(45) Date of Patent: *Oct. 18, 2016

(54) METHODS AND DEVICES FOR TRANSMITTING DATA

(71) Applicant: Huawei Technologies Co., Ltd., Shenzhen (CN)

(72) Inventors: Li Wang, Shenzhen (CN); Bin Zhen, Beijing (CN); Song Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,196

(22) Filed: Aug. 17, 2015

(65) Prior Publication Data
US 2015/0358951 A1 Dec. 10, 2015

Related U.S. Application Data

(63) Continuation of application No. 14/079,863, filed on Nov. 14, 2013, now Pat. No. 9,148,271, which is a continuation of application No. PCT/CN2012/074378, filed on Apr. 19, 2012.

(30) Foreign Application Priority Data

May 31, 2011 (CN) .......................... 2011 1 0144708

(51) Int. Cl.
*H04W 72/04* (2009.01)
*H04L 27/26* (2006.01)
*H04L 5/00* (2006.01)

(52) U.S. Cl.
CPC .......... *H04W 72/044* (2013.01); *H04L 5/0062* (2013.01); *H04L 27/2647* (2013.01); *H04W72/04* (2013.01); *H04W 72/0446* (2013.01); *H04W 72/0473* (2013.01); *H04W 72/0493* (2013.01); *H04W 72/042* (2013.01)

(58) Field of Classification Search
CPC H04L 27/2647; H04L 72/04; H04L 72/0493
See application file for complete search history.

(56) References Cited

U.S. PATENT DOCUMENTS 8,537,729 B2 * 9/2013 Hao ..................... H04L 5/0007
370/294
2004/0252659 A1 12/2004 Yun et al.
(Continued)

FOREIGN PATENT DOCUMENTS

CN 101394648 A 3/2009
CN 101682397 A 3/2010
(Continued)

OTHER PUBLICATIONS

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300, Version 10.3.0, $3^{rd}$ Generation Partnership Project, Valbonne, France (Mar. 2011).

(Continued)

*Primary Examiner* — Raj Jain
(74) *Attorney, Agent, or Firm* — Leydig, Voit & Mayer, Ltd.

(57) ABSTRACT

The present disclosure provides a system for transmitting data. The system comprises: a base station and a first user equipment, the first user equipment receives downlink data sent from a base station through downlink resources of a special subframe; acquires a position of uplink resources corresponding to the first user equipment in guard period resources of the special subframe, wherein the position of the uplink resources corresponding to the first user equipment in the guard period resources of the special subframe is staggered from a position of downlink resources corresponding to a second user equipment in the special subframe, and a round-trip time of the second user equipment is greater than a round-trip time of the first user equipment; and sends uplink data to the base station through the uplink resources corresponding to the first user equipment in the guard period resources of the special subframe.

30 Claims, 9 Drawing Sheets

(56) References Cited

U.S. PATENT DOCUMENTS

| | | | |
|---|---|---|---|
| 2011/0237270 A1* | 9/2011 | Noh | H04B 7/0413 455/450 |
| 2011/0292846 A1 | 12/2011 | Hu et al. | |
| 2012/0099532 A1 | 4/2012 | Lee et al. | |
| 2012/0163335 A1* | 6/2012 | Chung | H04L 5/0023 370/330 |
| 2013/0028221 A1* | 1/2013 | Seo | H04W 72/1284 370/329 |
| 2013/0077660 A1* | 3/2013 | Ko | H04B 7/0639 375/219 |
| 2013/0258938 A1* | 10/2013 | Sagfors | H04W 72/02 370/312 |

FOREIGN PATENT DOCUMENTS

| | | |
|---|---|---|
| CN | 101795473 A | 8/2010 |
| CN | 101809896 A | 8/2010 |
| CN | 101841906 A | 9/2010 |
| CN | 102137500 A | 7/2011 |
| EP | 1443794 A2 | 8/2004 |
| WO | WO 2008088252 A1 | 7/2008 |
| WO | WO 2008103089 A1 | 8/2008 |
| WO | WO 2011005727 A2 | 1/2011 |
| WO | WO 2011034317 A2 | 3/2011 |

OTHER PUBLICATIONS

"$3^{rd}$ Generation Partnership Project; Technical Specification Group Radio Access Network; Evolved Universal Terrestrial Radio Access (E-UTRA); Medium Access Control (MAC) protocol specification (Release 10)," 3GPP TS 36.321, Version 10.1.0, $3^{rd}$ Generation Partnership Project, Valbonne, France (Mar. 2011).

Notice of Allowance in corresponding U.S. Appl. 14/079,863 (May 22, 2015).

* cited by examiner

101, UE1 receives downlink data sent by a base station through a special subframe 102, The UE1 acquires a location of uplink resources corresponding to the UE1 in GP resources of the special subframe, wherein the location of the uplink resources corresponding to the UE1 in the GP resources of the special subframe is staggered from a location of downlink resources corresponding to a UE2 in the special subframe, and an RTT of the UE2 is greater than an RTT of the UE1

103, UE1 sends uplink data to the base station through the uplink resources corresponding to the UE1 in the GP resources of the special subframe

FIG. 1

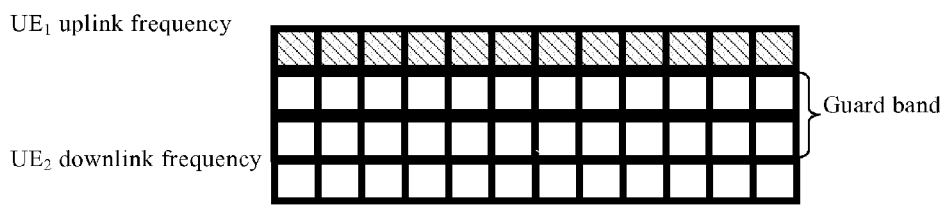

FIG. 3

```
┌─────────────────────────────────────────────────────────────────┐
│ 201, Sending, to a UE1, downlink data through downlink resources of a │
│                        special subframe                          │
└─────────────────────────────────────────────────────────────────┘
                                │
┌─────────────────────────────────────────────────────────────────┐
│   202, Receiving uplink data sent by the UE1 through uplink resources │
│  corresponding to the UE1 in GP resources of the special subframe, wherein │
│     a location of the uplink resources corresponding to the UE1 in the GP │
│    resources of the special subframe is staggered from a location of downlink │
│    resources corresponding to a UE2 in the special subframe, and a round-trip │
│          time of the UE2 is greater than a round-trip time of the UE1 │
└─────────────────────────────────────────────────────────────────┘
```

FIG. 4

301, Obtaining a round-trip time of a UE1 and a round-trip time of a UE2, wherein the round-trip time of the UE2 is greater than the round-trip time of the UE1

302, Determining, according to the round-trip time of the UE1 and the round-trip time of the UE2, a location of downlink resources corresponding to the UE1 in GP resources of a special subframe, wherein the location of the downlink resources corresponding to the UE1 in the GP resources of the special subframe is staggered from a location of uplink resources corresponding to the UE2 in the special subframe 303, Sending, to the UE1, downlink data through the downlink resources corresponding to the UE1 in the GP resources of the special subframe

FIG. 6

401, A UE1 receives downlink data sent by a base station through downlink resources corresponding to the UE1 in GP resources of a special subframe, wherein a location of the downlink resources corresponding to the UE1 in the GP resources of the special subframe is staggered from a location of uplink resources corresponding to a UE2 in the special subframe, and a round-trip time of the UE2 is greater than a round-trip time of the UE1

402, The UE1 sends uplink data to the base station through the uplink resources corresponding to the UE1 in the special subframe

FIG. 7

METHODS AND DEVICES FOR TRANSMITTING DATA

CROSS-REFERENCE TO RELATED APPLICATIONS

This application is a continuation of U.S. patent application Ser. No. 14/079,863, filed on Nov. 14, 2013, which is a continuation of International Patent Application No. PCT/CN2012/074378, filed on Apr. 19, 2012, which claims priority to Chinese Patent Application No. 201110144708.0, filed on May 31, 2011. The afore-mentioned patent applications are hereby incorporated by reference in their entireties.

TECHNICAL FIELD

The present disclosure relates to the technical field of communications, and more particularly, to methods and devices for transmitting data.

BACKGROUND

In a time division duplexing TDD (Time Division Duplexing) wireless communication system of a long term evolution LTE (Long Term Evolution)/an enhanced long term evolution LTE-A (LTE Advanced), each radio frame includes 10 subframes, and the subframe can be a downlink subframe, an uplink subframe or a special subframe depending on service usage of the subframe. Among them, the special subframe includes three special time slots, i.e., a downlink pilot time slot DwPTS (Downlink Pilot Time Slot), a guard period GP (Guard Period), and an uplink pilot time slot UpPTS (Uplink Pilot Time Slot).

The DwPTS of a frame structure in an LTE TDD system can be configured with 3 to 12 orthogonal frequency division multiplexing OFDM (Orthogonal Frequency Division Multiplexing) symbols in length, used for downlink transmission. The UpPTS can be configured with 1 to 2 OFDM symbols in length, used for uplink transmission. The GP is a guard interval between the uplink transmission and the downlink transmission, mainly consisting of a "round-trip time RTT (Round-trip Time)" and a "device transceiver conversion time delay". The device transceiver conversion time delay generally does not exceed a length of one OFDM symbol, and an RTT corresponding to a coverage radius of a cell mainly affects a GP length.

The frame structure of a cell is configured with a shorter GP in the prior art, so long as the GP can satisfy the transceiver conversion time delay. During data transmission, the base station, according to a round-trip time to a base station from each user equipment UE (User Equipment), schedules allowable interval between the uplink resources and downlink resources by the UE at both sides of the GP, so as to satisfy requirements of a round-trip transfer time, which is equivalent to adjusting the GP length of each UE. However, due to interference between UEs caused by different RTTs, the method for transmitting data will obviously affect normal communication between UEs with different RTTs and the base station.

SUMMARY

A main object of embodiments of the present disclosure is to provide a method and a device for transmitting data, so as to effectively eliminate interference between UEs caused by different RTTs.

An aspect of the present disclosure provides a method for transmitting data, comprising: receiving, by a UE1, downlink data sent from a base station through downlink resources of a special subframe; acquiring, by the UE1, a position of uplink resources corresponding to the UE1 in GP resources of the special subframe, wherein the position of the uplink resources corresponding to the UE1 in the GP resources of the special subframe is staggered from a position of downlink resources corresponding to a UE2 in the special subframe, and a round-trip time of the UE2 is greater than a round-trip time of the UE1; and sending, by the UE1, uplink data to the base station through the uplink resources corresponding to the UE1 in the GP resources of the special subframe.

Another aspect of the present disclosure also provides a method for transmitting data, comprising: sending, to a UE1, downlink data through downlink resources of a special subframe; receiving uplink data sent from the UE1 through uplink resources corresponding to the UE1 in GP resources of the special subframe, wherein a position of the uplink resources corresponding to the UE1 in the GP resources of the special subframe is staggered from a position of downlink resources corresponding to a UE2 in the special subframe, and a round-trip time of the UE2 is greater than a round-trip time of the UE1.

Another aspect of the present disclosure also provides a UE, comprising: a receiving unit, configured to receive downlink data sent from a base station through downlink resources of a special subframe; an acquisition unit, configured to acquire a position of uplink resources corresponding to the UE in GP resources of the special subframe, wherein the position of the uplink resources corresponding to the UE in the GP resources of the special subframe is staggered from a position of downlink resources corresponding to a UE2 in the special subframe, and a round-trip time of the UE2 is greater than a round-trip time of the UE; and a sending unit, configured to send uplink data to the base station through the uplink resources corresponding to the UE in the GP resources of the special subframe.

Another aspect of the present disclosure also provides a base station, comprising: a sending unit, configured to send to, a UE1, downlink data through downlink resources of a special subframe; and a receiving unit, configured to receive uplink data sent from the UE1 through uplink resources corresponding to the UE1 in GP resources of the special subframe, wherein a position of the uplink resources corresponding to the UE1 in the GP resources of the special subframe is staggered from a position of downlink resources corresponding to a UE2 in the special subframe, and a round-trip time of the UE2 is greater than a round-trip time of the UE1.

The above technical solutions can effectively eliminate interference between UEs caused by different RTTs.

Another aspect of the present disclosure also provides a method for transmitting data, comprising: obtaining a round-trip time of a UE1 and a round-trip time of a UE2, wherein the round-trip time of the UE2 is greater than the round-trip time of the UE1; determining, according to the round-trip time of the UE1 and the round-trip time of the UE2, a position of downlink resources corresponding to the UE1 in GP resources of a special subframe, so that the position of the downlink resources corresponding to the UE1 in the GP resources of the special subframe is staggered from a position of uplink resources corresponding to the UE2 in the special subframe; and sending, to the UE1, downlink data through the downlink resources corresponding to the UE1 in the GP resources of the special subframe.

Another aspect of the present disclosure also provides a method for transmitting data, comprising: receiving, by a UE1, downlink data sent from a base station through downlink resources corresponding to the UE1 in GP resources of a special subframe, wherein a position of the downlink resources corresponding to the UE1 in the GP resources of the special subframe is staggered from a position of uplink resources corresponding to a UE2 in the special subframe, and a round-trip time of the UE2 is greater than a round-trip time of the UE1; and sending, by the UE1, uplink data to the base station through uplink resources corresponding to the UE1 in the special subframe.

Another aspect of the present disclosure also provides a base station, comprising: an obtaining unit, configured to obtain a round-trip time of a UE1 and a round-trip time of a UE2, wherein the round-trip time of the UE2 is greater than the round-trip time of the UE1; a determining unit, configured to determine, according to the round-trip time of the UE1 and the round-trip time of the UE2, a position of downlink resources corresponding to the UE1 in GP resources of the special subframe, so that the position of the downlink resources corresponding to the UE1 in the GP resources of the special subframe is staggered from a position of uplink resources corresponding to the UE2 in the special subframe; and a sending unit, configured to send, to the UE1, downlink data through the downlink resources corresponding to the UE1 in the GP resources of the special subframe.

Another aspect of the present disclosure also provides a UE, comprising: a receiving unit, configured to receive downlink data sent from a base station through downlink resources corresponding to the UE in GP resources of a special subframe, wherein a position of the downlink resources corresponding to the UE in the GP resources of the special subframe is staggered from a position of uplink resources corresponding to a UE2 in the special subframe, and a round-trip time of the UE2 is greater than a round-trip time of the UE; and a sending unit, configured to send uplink data to the base station through uplink resources corresponding to the UE in the special subframe.

The above technical solutions can effectively eliminate interference between UEs caused by different RTTs.

BRIEF DESCRIPTION OF DRAWINGS

To make the technical solutions of embodiments of the present disclosure or the prior art more clearly, the following briefly introduces the accompanying drawings used in description of the embodiments. Apparently, the accompanying drawings only show certain embodiments of the present disclosure, and persons skilled in the art can derive other drawings from them without creative efforts.

FIG. 1 is a flow chart of a method for transmitting data through a special subframe according to an embodiment of the present disclosure;

FIG. 3 is a specific schematic diagram of a resource stagger in the method shown in FIG.1;

FIG. 4 is a flow chart of a method for transmitting data through a special subframe according to an embodiment of the present disclosure;

FIG. 6 is a flow chart of a method for transmitting data through a special subframe according to an embodiment of the present disclosure;

FIG. 7 is a flow chart of a method for transmitting data through a special subframe according to an embodiment of the present disclosure;

DESCRIPTION OF EMBODIMENTS

Figure 2:
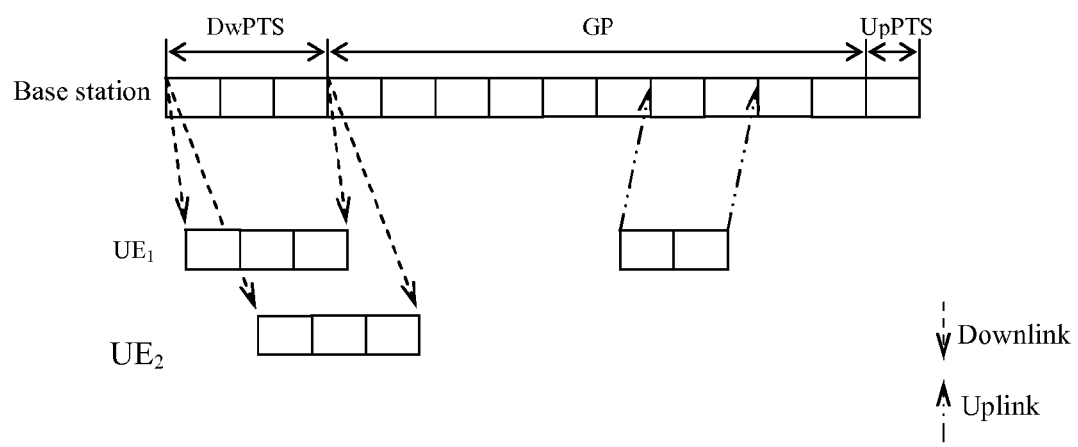
FIG. 2 is a specific schematic diagram of a resource stagger in the method shown in FIG.1.

The technical solutions in embodiments of the present disclosure are hereinafter described clearly and completely with reference to the accompanying drawings in the embodiments of the present disclosure.

Apparently, the embodiments described herein are only a part of the embodiments of the present disclosure, rather than all the embodiments. All other embodiments, which can be derived by persons skilled in the art based on the embodiments in the present disclosure without creative efforts, shall fall within the protection scope of the present disclosure.

The techniques described herein can be used for various wireless communication systems such as the current 2G and 3G communication systems and the next generation communication system, such as a global system for mobile communication (GSM, Global System for Mobile communications), a code division multiple access (CDMA, Code Division Multiple Access) system, a time division multiple access (TDMA, Time Division Multiple Access) system, a wideband code division multiple access (WCDMA, Wideband Code Division Multiple Access Wireless), a frequency division multiple addressing (FDMA, Frequency Division Multiple Addressing) system, an orthogonal frequency-division multiple access (OFDMA, Orthogonal Frequency-Division Multiple Access) system, a single carrier FDMA (SC-FDMA) system, a general packet radio service (GPRS, General Packet Radio Service) system, a long term evolution (LTE, Long Term Evolution) system, and other communication systems, and can be particularly suitable for a TDD system under the above systems.

Various aspects are described herein in connection with a terminal (UE) and/or a base station and/or a base station controller.

The terminal can be a wired terminal or a wireless terminal, and the wireless terminal may refer to a device providing voice and/or data connectivity to a user, a handheld device having wireless connection function, or other processing device connected to a wireless modem. The wireless terminal can communicate with one or more core networks via a radio access network (such as, RAN, Radio Access Network), and the wireless terminal can be a mobile terminal, such as a mobile phone (or a "cellular" phone) and a computer with a mobile terminal, and thus can be, for example, portable, pocket, hand-held, built-in computer, or car-mounted mobile devices which communicate voice and/ or data with the radio access network. For example, a personal communication service (PCS, Personal Communication Service) phone, a cordless phone, a session initiation protocol (SIP) phone, a wireless local loop (WLL, Wireless Local Loop) station, a personal digital assistant (PDA, Personal Digital Assistant) and other devices. The wireless terminal also can be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (such as, access point) can refer to a device in an access network that communicates over an air-interface, through one or more sectors, with wireless terminals. The base station can act as a router between the wireless terminal and the rest of the access network by performing a conversion between the received air-interface frames and IP packets, wherein the rest of the access network can include an Internet Protocol (IP) network. The base station also coordinates management of attributes for the air interface. For example, the base station can be a base station (BTS, Base Transceiver Station) in GSM or CDMA, or a base station (NodeB) in WCDMA, or an evolved Node B (NodeB or eNB or eNodeB, evolutional Node B) in LTE, and the present disclosure is not limited thereto.

The base station controller can be a base station controller (BSC, base station controller) in GSM or CDMA, or a radio network controller (RNC, Radio Network Controller) in WCDMA, and the present disclosure is not limited thereto.

Furthermore, the term "system" and "network" herein may be used interchangeably herein. The term "and/or" herein is merely to describe association relationship between associated objects, and indicates there may be three types of relationship, for example, A and/or B can indicate three cases, that is, A exists individually, A exists together with B, and B exists individually. Furthermore, the character "/" generally indicates that the before and after associated objects are in an alternative relationship.

As described above in the background, the special subframe of the frame structure in the LTE TDD system is composed of three special time slots in sequence, that is, DwPTS, GP and UpPTS, in the case of transmitting data through a special subframe, the DwPTS is used for transmitting downlink data, the UpPTS is used for transmitting uplink data, the GP is a guard period interval between the downlink data transmission and the uplink data transmission, however, the allowable intervals of the uplink and downlink resources in the special subframe by the UE can be adjusted, that is to say, the uplink transmitting data and/or the downlink transmitting data can be performed on the GP resources in the special subframe, but in fact, the time length of the GP resources in the special subframe of the cell is certainly constant.

In such a scenario that the GP resources in the special subframe are used for transmitting uplink data, as shown in FIG. 1, an embodiment of the present disclosure provides a method for transmitting data, based on a UE.

101, a UE1 (a first UE) receives downlink data sent from a base station through a special subframe.

Particularly, the UE1 is located in a cell served by the base station, data is transmitted through the special subframe. The base station firstly sends the downlink data to the UE1 through downlink resources of the special subframe, since there is a certain distance between the first UE and the station, the downlink data issued by the base station through the special subframe will arrive at the UE1 in a certain time delay.

Because there are a plurality of UEs in the cell served by the base station, and different UEs have different distances from the base station in the physical position and different channel conditions, the downlink data issued by the base station through the downlink sources of the special subframe may arrive at the UEs at different times.

102, The UE1 acquires a position of uplink resources corresponding to the UE1 in GP resources of the special subframe, wherein the position of the uplink resources corresponding to the UE1 in the GP resources of the special subframe is staggered from a position of downlink resources corresponding to a UE2 (a second UE) in the special subframe, and an RTT of the UE2 is greater than an RTT of the UE1.

It should be noted that, in all the embodiments of the present disclosure, the RTT of the UE2 is greater than the RTT of the UE1, the UE2 generally refers to a UE, at which the downlink data arrives after the downlinked data arrives at the UE1, in the cell served by the base station, and the UE2 may be receiving the downlink data when the UE1 initiates uplink data transmission through the special subframe. For example, the UE2 may be a UE located at an utmost edge of a cell, and have a distance from the base station greater than the distance between the UE1 and the base station; the UE2 also may be nearer to the UE1 in the physical position, for example, within a radius of 2 km, but the RTT of the UE2 is greater than the RTT of the UE1. Embodiments of the present disclosure are preferably applicable to cases that not all the paths from the UE1 and the UE2 to the base station are straight paths.

In embodiments of the present disclosure, the location of resources includes a time location and a frequency location of resources. The uplink resources corresponding to the UE1 in the GP resources of the special subframe are resources occupied by initiating the uplink data transmission in the GP resources of the special subframe after the UE1 receives the downlink data; the downlink resources corresponding to the UE2 in the GP resources of the special subframe are resources occupied by downlink data arriving at the UE2; the position of the uplink resources corresponding to the UE1 in the GP resources of the special subframe is staggered from the position of downlink resources corresponding to a UE2 in the special subframe, which means that these two resources are not overlapped either in terms of time or in terms of frequency, for example, a time of the uplink resources corresponding to the UE1 in the GP resources of the special subframe is after a time of receiving, by the UE2, downlink data sent through the special subframe, or a frequency of the uplink resources corresponding to the UE1 in the GP resources of the special subframe is orthogonal to a frequency of downlink resources corresponding to the UE2 in the special subframe.

As shown in FIG. 2, the time of the uplink resources of uplink transmission initiated by the UE1 in the GP resources of the special subframe is after a time of receiving, by the UE2, downlink data sent through the special subframe, that is, the UE1 initiates uplink transmission after the downlink data of the UE2 arrive, and therefore, the downlink data of the UE2 cannot cause interference on the uplink data of the UE1.

Preferably, the GP resources are divided into a first half of the GP resources and a second half of the GP resources in terms of time, so that the uplink resources corresponding to the UE1 in the GP resources of the special subframe are in the second half of the GP resources in terms of time.

Optionally, duration of the second half of the GP resources is less than or equal to half of duration of the GP resources, that is, duration of the first half of the GP resources is more than or equal to half of duration of the GP resources; in this case, as known from the prior art, downlink resources corresponding to the UE1 and the UE2 in the special subframe all are located at the first half of the GP resources, and the uplink resources corresponding to the UE1 in the GP resources of the special subframe are located at the second half of the GP resources in terms of time, therefore, it becomes possible to secure the UE1 can initiate uplink transmission after the downlink data of the UE2 arrive, and the uplink data of the UE1 cannot cause interference on the downlink data of the UE2.

Optionally, duration of the second half of the GP resources is less than or equal to a difference between duration of the GP resources and half duration of a maximum round-trip time corresponding to a set of user equipments, that is, duration of the first half of the GP resources is more than or equal to half duration of the maximum round-trip time corresponding to the set of the user equipments; the set of the UEs include a UE1 and a UE2. This applies when interference between a set of UEs needs to be reduced. As known from the prior art, in the set of UEs, downlink resources corresponding to the UE1, the UE2 and other UEs in the set all are located at the first half of the GP resources, and the uplink resources corresponding to the UE1 in the GP resources of the special subframe are located at the second half of the GP resources in terms of time, therefore, it becomes possible to secure the UE1 can initiate uplink transmission after the downlink data of the UE2 arrive, and the uplink data of the UE1 cannot cause interference on the downlink data of the UE2.

As shown in FIG. 3, the frequency of the uplink resources of uplink transmission initiated by the UE1 in the GP resources of the special subframe is orthogonal to the frequency of downlink resources corresponding to the UE2 in the special subframe, and there is a guard band between the two frequencies, therefore, the uplink data of the UE1 cannot cause interference on the downlink data of the UE2.

The position of the uplink resources corresponding to the UE1 in the GP resources of the special subframe can be notified by the base station to the UE1, or can be acquired by the UE1 itself by computation, and etc. Optionally, the UE1 can acquire the position of uplink resources corresponding to the UE1 in GP resources of the special subframe, according to a notification on a position of uplink resources corresponding to the UE1 in GP resources of the special subframe, sent from the base station and received by the UE1; the UE1 also can acquire by itself, according to an RTT of the UE1 and an RTT of the UE2, the position of uplink resources corresponding to the UE1 in GP resources of the special subframe; the UE1 also can acquire, according to a preset value, the position of uplink resources corresponding to the UE1 in GP resources of the special subframe.

For example, in terms of an immobile UE with a stationary location within a certain period, such as a smart meter Smart Meter, and a feeder terminal unit FTU (Feeder Terminal Unit), the RTT during which it arrives at the base station has an incredibly small range of variation and can be considered to be constant, and therefore, the position of the uplink resources corresponding to each UE in the GP resources of the special subframe can be preset, and an RTT of each UE also can be stored in advance, so that each UE can acquire, according to the stored RTT, the position of the uplink resources corresponding to each UE in the GP resources of the special subframe.

103, UE1 sends uplink data to the base station through the uplink resources corresponding to the UE1 in the GP resources of the special subframe.

In the method for transmitting data through the special subframe according to this embodiment, since the position of the uplink resources corresponding to the UE1 in the GP resources of the special subframe is staggered from the position of downlink resources corresponding to a UE2 in the special subframe, therefore, when data is transmitted through the special subframe, and the uplink data sent in GP resources of the special subframe by the UE1 cannot cause interference on the downlink data received by the UE2 through the downlink resources of the special subframe, and this can effectively eliminate interference between UEs caused by different RTTs.

In another embodiment of the present disclosure, the guard period interval between the downlink data transmission and the uplink data transmission of the UE1 may be greater than a minimum guard period corresponding to the UE1 of the present embodiment, wherein the minimum guard period is a minimum guard period during which the UE1 and the base station can perform normal uplink and downlink data transmission, so that the efficiency of reporting an emergency event can be guaranteed. The emergency event refers to an abnormal event or a special event with a higher requirement on a round-trip time, for example, in terms of a smart power grid, the emergency event includes open circuit, current overload, switching on/off and so on, in terms of various communication systems, the emergency event may have different time delay requirements, for example, some system defines an event with a round-trip time which is within 10 ms as the emergency event, some system defines an event with a round-trip time which is within 20 ms or 100 ms as the emergency event, the present disclosure is not limited thereto, and the embodiment of the present disclosure also includes the following contents.

The UE1 acquires a minimum guard period corresponding to the UE1, according to a notification sent from the base station or an RTT of the UE1.

The UE1 reports an emergency event with the minimum guard period through the GP resources of the special subframe, that is, the UE1 sends uplink data of the emergency event to the base station in the resources at a time interval of the minimum GP from the time when the UE1 receives downlink resources of the downlink data, through the GP resources of the special subframe.

As such, it can effectively improve the efficiency of reporting the emergency event, and guarantee normal operation of the UE. In order to effectively prevent the downlink data of the UE2 from interfering in the uplink data of the emergency event of the UE1, in the embodiment of the present disclosure, preferably, a frequency of the resources for reporting the emergency event in the GP resources of the special subframe is orthogonal to a frequency of downlink resources corresponding to the UE2 in the special subframe.

Corresponding to the method shown in FIG. 1, in such a scenario that the GP resources in the special subframe are used for transmitting uplink data, as shown in FIG. 4, an embodiment of the present disclosure also provides a method for transmitting data, based on a base station.

201, Sending, to a UE1, downlink data through downlink resources of a special subframe;

202, Receiving uplink data sent from the UE1 through uplink resources corresponding to the UE1 in GP resources of the special subframe, wherein a position of the uplink resources corresponding to the UE1 in the GP resources of the special subframe is staggered from a position of downlink resources corresponding to a UE2 in the special subframe, and a round-trip time of the UE2 is greater than a round-trip time of the UE1.

In the method for transmitting data through the special subframe according to the embodiment of the present disclosure, since the position of the uplink resources corresponding to the UE1 in the GP resources of the special subframe is staggered from the position of downlink resources corresponding to the UE2 in the special subframe, when the GP resources of the special subframe are used for uplink data transmission, the uplink data sent from the UE1 in the GP resources of the special subframe cannot cause interference on the downlink data received by the UE2 through the downlink resources of the special subframe, and thus it can effectively eliminate interference between UEs caused by different RTTs.

Particularly, the uplink resources corresponding to the UE1 in the GP resources of the special subframe are resources occupied by initiating uplink data transmission in the GP resources of the special subframe after the UE1 receives the downlink data; the downlink resources corresponding to the UE2 in the special subframe are resources occupied by downlink data arriving at the UE2; the position of the uplink resources corresponding to the UE1 in the GP resources of the special subframe is staggered from the position of downlink resources corresponding to a UE2 in the special subframe, which means that these two resources are not overlapped either in terms of time or in terms of frequency, which particularly means that, a time of the uplink resources corresponding to the UE1 in the GP resources of the special subframe is after a time of receiving, by the UE2, downlink data sent through the special subframe, or a frequency of the uplink resources corresponding to the UE1 in the GP resources of the special subframe is orthogonal to a frequency of downlink resources corresponding to the UE2 in the special subframe, in this way, the uplink data of the UE1 cannot cause interference on the downlink data of the UE2.

In another embodiment of the present disclosure, the method for transmitting data through the special subframe provided by the present embodiment also includes the following contents.

Acquiring the RTT of the UE1 and the RTT of the UE2, the RTT of the UE2 is greater than the RTT of the UE1; optionally, the base station can respectively acquire, according to RTTs of the UE1 and the UE2 in the previous data transmission, the RTT of the UE1 and the RTT of the UE2; also can compute, according to a preamble sequence sent from the UE1 and a preamble sequence sent from the UE2, the RTT of the UE1 and the RTT of the UE2; and also can compute, according to a broadcast timing message, the RTT of the UE1 and the RTT of the UE2, or other methods, and the present disclosure is not limited thereto.

Determining, according to the round-trip time of the UE1 and the round-trip time of the UE2, a position of the uplink resources corresponding to the UE1 in GP resources of the special subframe, wherein the position of the uplink resources corresponding to the UE1 in the GP resources of the special subframe is staggered from the position of downlink resources corresponding to a UE2 in the special subframe;

Sending, to the UE1, a notification of the uplink resources corresponding to the UE1 in GP resources of the special subframe. Particularly, the base station can notify the UE1 of the location of resources allocated for the UE1 by scheduling or broadcasting. The UE1 can acquire, according to the notification sent from the base station, the position of uplink resources corresponding to the UE1 in GP resources of the special subframe, and initiate uplink data transmission using the uplink resources.

In another embodiment of the present disclosure, in order to guarantee efficiency of reporting an emergency event, the present embodiment of the present disclosure also includes the following contents.

Determining, according to the RTT of the UE1, a minimum guard period corresponding to the UE1; the minimum guard period is a minimum guard period during which the UE1 and the base station can perform normal uplink and downlink data transmission;

Sending, to the UE1, a notification of the minimum guard period corresponding to the UE1, so that the UE1 can report the emergency event with the minimum guard period through the GP resources of the special subframe in case of an emergency event, thus guaranteeing the efficiency of reporting the emergency event and normal operation of the UE1.

Under a scenario of reporting the emergency event by the UE1, preferably, the present embodiment of the present disclosure also includes the following contents.

Scheduling, a frequency of the resources reporting the emergency event in the GP resources of the special subframe and a frequency of downlink resources corresponding to the UE2 in the special subframe, so that the two frequencies are orthogonal to each other. As such, it can effectively prevent the downlink data of the UE2 from interfering in the uplink data of the emergency event of the UE1.

Figure 5:
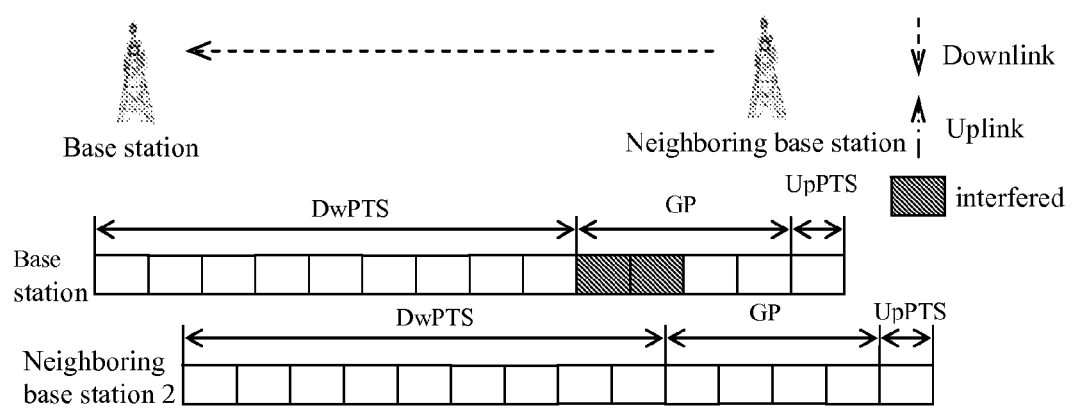
FIG. 5 is a schematic diagram of an interference of a neighboring base station in the method shown in FIG.4.

As shown in FIG. 5, data transmission by the base station eNB1 through a special subframe may be interfered by data transmission of a neighboring base station eNB2 through a special subframe. To avoid interference of data transmission through the special subframe from the neighboring base station, in another embodiment of the present disclosure, the method of the present embodiment also includes the following contents.

Obtaining a location of resources which are in the GP resources of the special subframe and interfered by downlink data of a neighboring base station; particularly, the base station can compute, by searching for a primary synchronization signal Primary Synchronization Signal PSS and a secondary synchronization signal Secondary Synchronization Signal SSS of a neighboring cell and etc., an interference location of the downlink signal of the neighboring base station.

Shielding the interfered GP resources and/or jointly scheduling the interfered GP resources with the neighboring base station.

If the interfered GP resources are shielded, the UE fails to use the shielded resources, therefore, after the interfered GP resources are shielded, the base station shall send, to UEs within the own cell, a notification for indicating a location of the shielded GP resources, so that the UE can know which GP resources of the special subframe are available.

Optionally, the base station jointly schedules the interfered GP resources with the neighboring base station, which particularly can include improving a signal to interference ratio and making frequency bands orthogonal to each other, where improving the signal to interference ratio particularly is:

Increasing a sending power of uplink data of UE which transmits the uplink data using the interfered GP resources and/or decreasing a sending power of the interfering downlink data. For example, scheduling the downlink data of the base station interfered by an interference source (namely a neighboring base station) to a user having a good channel condition near the base station in the neighboring base station, so as to reduce a power of an interfering portion. Meanwhile, appropriately increasing a transmission power of an uplink signal of the UE near the base station in the base station.

Where, making frequency bands orthogonal to each other particularly is:

The base station jointly schedules a frequency of the interfered GP resources and a frequency occupied by the interfering downlink data with the neighboring base station, so that the two frequencies are orthogonal to each other. For example, if the neighboring cell is an interference caused by a physical downlink shared channel PDSCH (Physical Downlink Shared Channel), jointly scheduling so that the interfering portion is orthogonal to a frequency band occupied by a sending portion in the GP resources. When a physical random access channel PRACH (Physical Random Access Channel) in the GP is scheduled, frequency bands occupied by a primary synchronization signal PSS (Primary Synchronization Signal), a secondary synchronization signal (SSS, Secondary Synchronization Signal) and PRACH of the neighboring cell shall be avoided.

In such a scenario that the GP resources in the special subframe are used for transmitting downlink data, as shown in FIG. 6, an embodiment of the present disclosure provides a method for data transmission, based on a base station.

301, Obtaining a round-trip time of a UE1 and a round-trip time of a UE2, wherein the round-trip time of the UE2 is greater than the round-trip time of the UE1.

302, Determining, according to the round-trip time of the UE1 and the round-trip time of the UE2, a position of downlink resources corresponding to the UE1 in GP resources of a special subframe, wherein the position of the downlink resources corresponding to the UE1 in the GP resources of the special subframe is staggered from a position of uplink resources corresponding to the UE2 in the special subframe.

Particularly, the downlink resources corresponding to the UE1 in the special subframe are resources occupied by downlink data arriving at the UE1; the uplink resources corresponding to the UE2 in the GP resources of the special subframe are resources occupied by uplink data transmission initiated in the GP resources of the special subframe after the UE2 receives downlink data; the position of the uplink resources corresponding to the UE2 in the special subframe is staggered from the position of the downlink resources corresponding to a UE1 in the GP resources of the special subframe, which means that these two resources are not overlapped either in terms of time or in terms of frequency, which particularly means that, a time of the uplink resources corresponding to the UE2 of the special subframe is after a time of receiving, by the UE1, downlink data sent through the GP resources of the special subframe, or a frequency of the downlink resources corresponding to the UE1 in the GP resources of the special subframe is orthogonal to a frequency of uplink resources corresponding to the UE2 in the special subframe.

303, Sending, to the UE1, downlink data through the downlink resources corresponding to the UE1 in the GP resources of the special subframe.

In the method for data transmission through the special subframe according to this embodiment, since the position of the downlink resources corresponding to the UE1 in the GP resources of the special subframe is staggered from the position of uplink resources corresponding to a UE2 in the special subframe, therefore, when data is transmitted through the special subframe, and the uplink data sent in the special subframe by the UE2 cannot cause interference on the downlink data received by the UE1 through the GP resources of the special subframe, and as such it can effectively eliminate interference between UEs caused by different RTTs.

In another embodiment of the present disclosure, in order to effectively avoid interference on data transmission of a neighboring base station, the method of the present embodiment of the present disclosure also includes the following contents.

Obtaining a location of resources which are in the GP resources of the special subframe and interfer in uplink data of the neighboring base station; particularly, the neighboring cell base station can compute, by searching for a primary synchronization signal PSS and a secondary synchronization signal SSS of the own cell and etc., an interference location of downlink signals of the own cell base station, and notify the own cell base station through an X2 interface.

Shielding the interfering guard period resources and/or jointly scheduling the interference with the neighboring base station.

If the interfering GP resources is shielded, the UE fails to use the shielded resources, therefore, after the interfering GP resources are shielded, the base station shall send, to UEs within the own cell, a notification for indicating the shielded GP resources, so that the UE can know which GP resources of the special subframe are available.

Optionally, the base station jointly schedules the interference with the neighboring base station, which particularly can include improving a signal to interference ratio and making frequency bands orthogonal to each other, where improving the signal to interference ratio particularly is as follows.

Decreasing a sending power of downlink data of the base station of the local cell which transmits the downlink data using the interfering GP resources and/or increasing a sending power of the interfered uplink data. For example, scheduling downlink data of an interference source (namely the own cell base station) interfering on the neighboring base station to a user having a good channel condition near the own cell base station in the own cell base station, so as to reduce a power of an interfering portion. Meanwhile, appropriately increasing a transmission power of an uplink signal of the UE near the neighboring base station in the neighboring cell base station.

Where, making frequency bands orthogonal to each other particularly is: the base station jointly schedules a frequency of the interfering GP resources and a frequency occupied by the interfered downlink data with the neighboring base station, so that the two frequencies are orthogonal to each other. For example, if the own cell is an interference caused by a physical downlink shared channel PDSCH, jointly scheduling so that the interfered portion is orthogonal to a frequency band occupied by a sending portion in the GP resources. When a physical random access channel PRACH in the neighboring cell is scheduled, frequency bands occupied by PSS, SSS and PRACH of the own cell shall be avoided.

Corresponding to the method shown in FIG. 6, in such a scenario that the GP resources in the special subframe are used for transmitting downlink data, as shown in FIG. 7, an embodiment of the present disclosure also provides a method for transmitting data, based on a UE.

401, a UE1 receives downlink data sent from a base station through downlink resources corresponding to the UE1 in GP resources of a special subframe, wherein a position of the downlink resources corresponding to the UE1 in the GP resources of the special subframe is staggered from a position of uplink resources corresponding to a UE2 in the special subframe, and a round-trip time of the UE2 is greater than a round-trip time of the UE1.

402, The UE1 sends uplink data to the base station through uplink resources corresponding to the UE1 in the special subframe.

In the method for transmitting data through the special subframe according to this embodiment, since the position of the downlink resources corresponding to the UE1 in the GP resources of the special subframe is staggered from the position of the uplink resources corresponding to the UE2 in the special subframe, therefore, when data are transmitted through the special subframe, the uplink data sent in the special subframe by the UE2 cannot cause interference on the downlink data received by the UE1 through the GP resources of the special subframe, and as such it can effectively eliminate interference between UEs caused by different RTTs.

Where, the position of the downlink resources corresponding to the UE1 in the GP resources of the special subframe is staggered from the position of downlink resources corresponding to a UE2 in the special subframe, including:

a time of the uplink resources corresponding to the UE2 of the special subframe is after a time of receiving, by the UE1, downlink data sent through the GP resources of the special subframe;

or a frequency of the downlink resources corresponding to the UE1 in the GP resources of the special subframe is orthogonal to a frequency of uplink resources corresponding to the UE2 in the special subframe.

Figure 8:
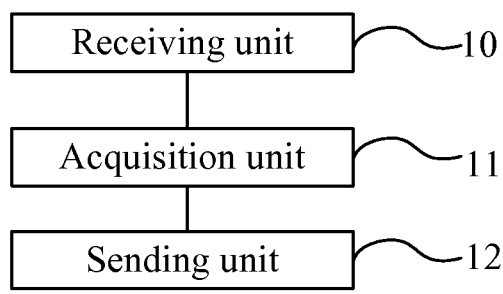
FIG. 8 is a schematic structural diagram of a UE according to an embodiment of the present disclosure.

Correspondingly to the method above, an embodiment of the present disclosure also provides a UE, used in a scenario that the guard period resources in the special subframe are used for transmitting uplink data, as shown in FIG. 8, the UE includes a receiving unit 10, an acquisition unit 11, and a sending unit 12.

The receiving unit 10 is configured to receive downlink data sent from a base station through downlink resources of a special subframe.

The acquisition unit 11 is configured to acquire a position of uplink resources corresponding to the UE in GP resources of the special subframe, wherein the position of the uplink resources corresponding to the UE in the GP resources of the special subframe is staggered from a position of downlink resources corresponding to a UE2 in the special subframe, and a round-trip time of the UE2 is greater than a round-trip time of the UE.

The sending unit 12 is configured to send uplink data to the base station through the uplink resources corresponding to the UE in the GP resources of the special subframe.

As for the UE according to the present embodiment of the present disclosure, since the position of the uplink resources corresponding to the UE in the GP resources of the special subframe is staggered from the position of downlink resources corresponding to a UE2 in the special subframe, therefore, when data are transmitted through the special subframe, and the uplink data sent in GP resources of the special subframe by the UE according to the present embodiment of the present disclosure cannot cause interference on the downlink data received by the UE2 through the downlink resources of the special subframe, and as such it can effectively eliminate interference between UEs caused by different RTTs.

Where, the position of the uplink resources corresponding to the UE in the GP resources of the special subframe, acquired by the acquisition unit 11 is staggered from the position of downlink resources corresponding to a UE2 in the special subframe, which particularly means that: a time of the uplink resources corresponding to the UE in the GP resources of the special subframe is after a time of receiving, by the UE2, downlink data sent through the special subframe, or a frequency of the uplink resources corresponding to the UE1 in the GP resources of the special subframe is orthogonal to a frequency of downlink resources corresponding to the UE2 in the special subframe; for example, the uplink resources corresponding to the UE in the GP resources of the special subframe are located at the second half of the GP resources in terms of time, the downlink resources corresponding to the UE2 in the special subframe are located at the first half of the GP resources, wherein the first half and the second half of the GP resources are the same in duration, both are half of duration of the GP resources.

In this way, the available uplink and downlink resources in the GP resources are distributed symmetrically, therefore, it becomes possible to secure that the UE in embodiments of the present disclosure can initiate uplink transmission after the downlink data of the UE2 arrive, and the uplink data of the UE in embodiments of the present disclosure cannot cause interference on the downlink data of the UE2.

Where, the position of the uplink resources corresponding to the UE in the GP resources of the special subframe, acquired by the acquisition unit 11 is staggered from the position of downlink resources corresponding to a UE2 in the special subframe, which also means that: a frequency of the uplink resources corresponding to the UE1 in the GP resources of the special subframe is orthogonal to a frequency of downlink resources corresponding to the UE2 in the special subframe.

Optionally, the acquisition unit 11 is further configured to receive a notification of the position of uplink resources corresponding to the UE in GP resources of the special subframe, sent from the base station, and acquire, according to the notification, the position of uplink resources corresponding to the UE in GP resources of the special subframe; or acquire, according to an RTT of the UE and an RTT of the UE2, the position of uplink resources corresponding to the UE in GP resources of the special subframe; or acquire, according to a preset value, the position of uplink resources corresponding to the UE in GP resources of the special subframe.

In another embodiment of the present disclosure, the acquisition unit 11 is further configured to acquire a minimum guard period corresponding to the UE, according to the notification sent from the base station or the round-trip time of the UE.

At this time, the sending unit 12 is further configured to report an emergency event with the minimum guard period through the GP resources of the special subframe. Preferably, the sending unit 12 schedules a frequency of the resources reporting the emergency event and a frequency of downlink resources corresponding to the UE2 in the special subframe, so that these two frequencies are orthogonal to each other.

Figure 9:
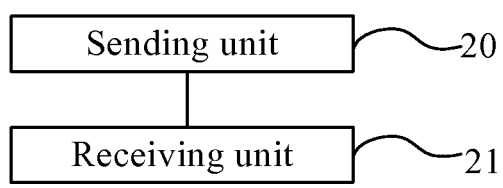
FIG. 9 is a schematic structural diagram of a base station according to an embodiment of the present disclosure.

Correspondingly to the method above, an embodiment of the present disclosure also provides a base station, used in a scenario that the GP resources in the special subframe are used for transmitting uplink data, as shown in FIG. 9, the base station includes a sending unit 20 and a receiving unit 21.

The sending unit 20 is configured to send to, a UE1, downlink data through downlink resources of a special subframe.

The receiving unit 21 is configured to receive uplink data sent from the UE1 through uplink resources corresponding to the UE1 in GP resources of the special subframe, wherein a position of the uplink resources corresponding to the UE1 in the GP resources of the special subframe is staggered from a position of downlink resources corresponding to a UE2 in the special subframe, and a round-trip time of the UE2 is greater than a round-trip time of the UE1.

As for the base station according to the present embodiment of the present disclosure, since the position of the uplink resources corresponding to the UE1 in the GP resources of the special subframe is staggered from the position of downlink resources corresponding to a UE2 in the special subframe, therefore, when data are transmitted through the special subframe, and the uplink data sent in GP resources of the special subframe by the UE1 cannot cause interference on the downlink data received by the UE2 through the downlink resources of the special subframe, and as such it can effectively eliminate interference between UEs caused by different RTTs.

Where, the position of the uplink resources corresponding to the UE1 in the GP resources of the special subframe is staggered from the position of downlink resources corresponding to a UE2 in the special subframe, which particularly means that: a time of the uplink resources corresponding to the UE1 in the GP resources of the special subframe is after a time of receiving, by the UE2, downlink data sent through the special subframe, or a frequency of the uplink resources corresponding to the UE1 in the GP resources of the special subframe is orthogonal to a frequency of downlink resources corresponding to the UE2 in the special subframe; for example, the uplink resources corresponding to the UE1 in the GP resources of the special subframe are located at the second half of the GP resources in terms of time, the downlink resources corresponding to the UE2 in the special subframe are located at the first half of the GP resources, wherein the first half and the second half of the GP resources are the same in duration, both are half of duration of the GP resources.

In this way, the available uplink and downlink resources in the GP resources are distributed symmetrically, therefore, it becomes possible to secure that the UE1 can initiate uplink transmission after the downlink data of the UE2 arrive, and the uplink data of the UE1 cannot cause interference on the downlink data of the UE2.

Figure 10:
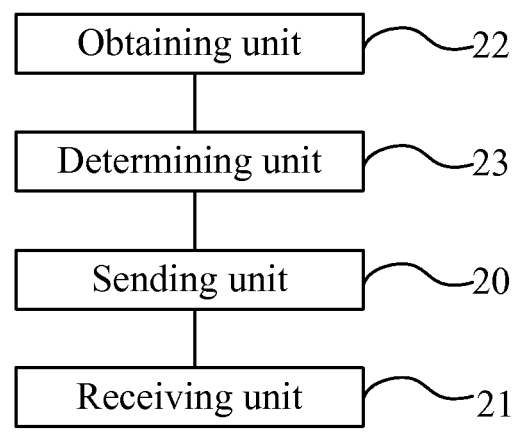
FIG. 10 is a schematic structural diagram of a base station according to an embodiment of the present disclosure.

In another embodiment of the present disclosure, as shown in FIG. 10, the base station of the present embodiment also includes: an obtaining unit 22 and a determining unit 23.

The obtaining unit 22 is configured to obtain a round-trip time of a UE1 and a round-trip time of a UE2, wherein the round-trip time of the UE2 is greater than the round-trip time of the UE1.

The determining unit 23 is configured to determine, according to the round-trip time of the UE1 and the round-trip time of the UE2, the position of uplink resources corresponding to the UE1 in GP resources of the special subframe, wherein the position of the uplink resources corresponding to the UE1 in the GP resources of the special subframe is staggered from the position of downlink resources corresponding to a UE2 in the special subframe.

The sending unit 20 is further configured to send, to the UE1, a notification of the position of the uplink resources corresponding to the UE1 in the GP resources of the special subframe.

Figure 11:
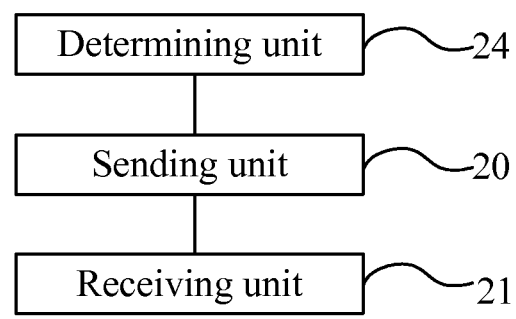
FIG. 11 is a schematic structural diagram of a base station according to an embodiment of the present disclosure.

In another embodiment of the present disclosure, as shown in FIG. 11, the base station of the present embodiment also includes: a determining unit 24, configured to determine, according to the round-trip time of the UE1, a minimum guard period corresponding to the UE1.

The sending unit 20 is further configured to send, to the UE1, a notification of the minimum guard period corresponding to the UE1, so that the UE1 reports the emergency event with the minimum guard period through the GP resources of the special subframe, thus guaranteeing the efficiency of reporting the emergency event and normal operation of the UE1.

Figure 12:
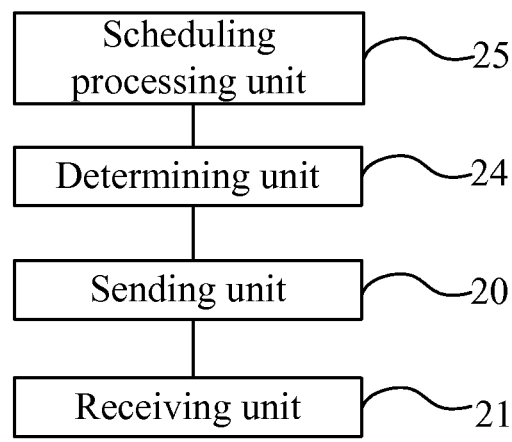
FIG. 12 is a schematic structural diagram of a base station according to an embodiment of the present disclosure.

At this time, as shown in FIG. 12, the base station may further include a scheduling processing unit 25, configured to schedule, a frequency of the resources reporting the emergency event in the GP resources of the special subframe and a frequency of downlink resources corresponding to the UE2 in the special subframe, so that these two frequencies are orthogonal to each other. As such it can effectively prevent the downlink data of the UE2 from interfering in the uplink data of the emergency event of the UE1.

Figure 13:
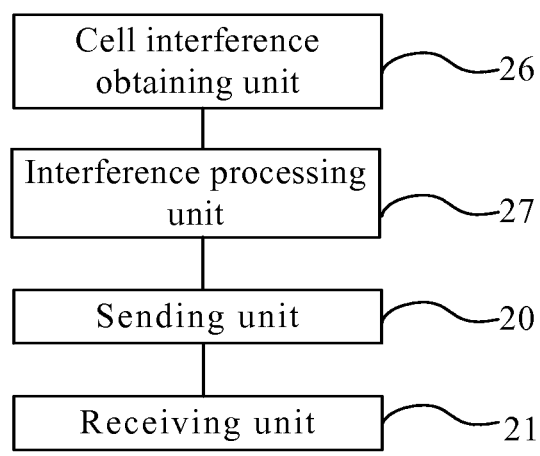
FIG. 13 is a schematic structural diagram of a base station according to an embodiment of the present disclosure.

In another embodiment of the present disclosure, as shown in FIG. 13, the base station also includes: a cell interference obtaining unit 26 and an interference processing unit 27.

The cell interference obtaining unit 26 is configured to obtain a location of resources which are in the GP resources of the special subframe and interfered by downlink data of a neighboring base station.

The interference processing unit 27 is configured to shield the interfered GP resources and/or jointly scheduling the interfered GP resources with the neighboring base station.

Optionally, the interference processing unit 27 can specifically be configured to shield the interfered GP resources.

At this time, the sending unit 20 is further configured to send, to a UE within an own cell, a notification for indicating the shielded GP resources.

Optionally, the interference processing unit 27 is specifically configured to jointly schedule the interference with the neighboring base station, including: increasing a sending power of uplink data of UE which transmits the uplink data using the interfered GP resources and/or decreasing a sending power of the interfering downlink data; or A frequency of the interfered GP resources and a frequency occupied by the interfering downlink data are jointly scheduled with the neighboring base station, so that these two frequencies are orthogonal to each other.

Figure 14:
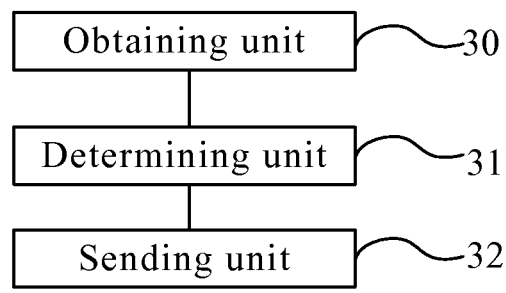
FIG. 14 is a schematic structural diagram of a base station according to an embodiment of the present disclosure.

Correspondingly, an embodiment of the present disclosure also provides a base station, used in a scenario that the GP resources in the special subframe are used for transmitting downlink data, as shown in FIG. 14, the base station includes an obtaining unit 30, a determining unit 31 and a sending unit 32.

The obtaining unit 30 is configured to obtain a round-trip time of a UE1 and a round-trip time of a UE2, wherein the round-trip time of the UE2 is greater than the round-trip time of the UE1.

The determining unit 31 is configured to determine, according to the round-trip time of the UE1 and the round-trip time of the UE2, a position of downlink resources corresponding to the UE1 in GP resources of the special subframe, so that the position of the downlink resources corresponding to the UE1 in the GP resources of the special subframe is staggered from a position of uplink resources corresponding to a UE2 in the special subframe.

The sending unit 32 is configured to send, to the UE1, downlink data through the downlink resources corresponding to the UE1 in the GP resources of the special subframe.

In the base station according to this embodiment, since the position of the downlink resources corresponding to the UE1 in the special subframe is staggered from the position of uplink resources corresponding to the UE2 in the special subframe, therefore, when data are transmitted through the special subframe, and the uplink data sent in the special subframe by the UE2 cannot cause interference on the downlink data received by the UE1 through the GP resources of the special subframe, and as such it can effectively eliminate interference between UEs caused by different RTTs.

Where, the position of the downlink resources corresponding to the UE1 in the GP resources of the special subframe is staggered from the position of uplink resources corresponding to a UE2 in the special subframe, including: a time of the uplink resources corresponding to the UE2 in the special subframe is after a time of receiving, by the UE1, downlink data sent through the GP resources of the special subframe; or a frequency of the downlink resources corresponding to the UE1 in the GP resources of the special subframe is orthogonal to a frequency of uplink resources corresponding to the UE2 in the special subframe.

Figure 15:
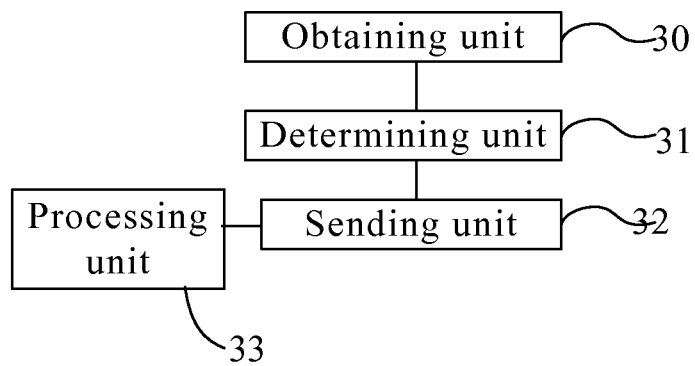
FIG. 15 is a schematic structural diagram of a base station according to an embodiment of the present disclosure.

In another embodiment of the present disclosure, as shown in FIG. 15, the obtaining unit 30 is configured to obtain a location of resources which are in the GP resources of the special subframe and interfer in uplink data of a neighboring base station.

The base station further includes a processing unit 33, configured to shield the interfering GP resources and/or jointly schedule the interference with the neighboring base station.

Optionally, the processing unit 33 can specifically be configured to shield the interfered GP resources.

At this time, the sending unit 32 is further configured to send, to a UE within an own cell, a notification for indicating a location of the shielded GP resources.

Optionally, the processing unit 33 is specifically configured to jointly schedule the interference with the neighboring base station, including: decreasing a sending power of downlink data of a UE which transmits the downlink data using the interfering GP resources and/or increasing a sending power of the interfered uplink data; or jointly scheduling a frequency of the interfering GP resources and a frequency occupied by the interfered uplink data with the neighboring base station, so that these two frequencies are orthogonal to each other.

Figure 16:
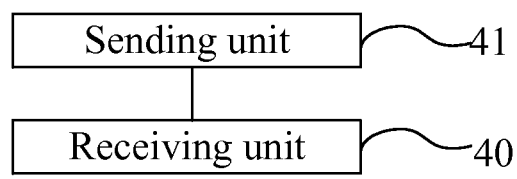
FIG. 16 is a schematic structural diagram of a UE according to an embodiment of the present disclosure.

Correspondingly, an embodiment of the present disclosure also provides a UE, used in a scenario that the GP resources in the special subframe are used for transmitting downlink data, as shown in FIG. 16, the UE includes a receiving unit 40 and a sending unit 41.

The receiving unit 40 is configured to receive downlink data sent from a base station through downlink resources corresponding to the UE in GP resources of a special subframe, wherein a position of the downlink resources corresponding to the UE in the GP resources of the special subframe is staggered from a position of uplink resources corresponding to a UE2 in the special subframe, and a round-trip time of the UE2 is greater than a round-trip time of the UE.

The sending unit 41 is configured to send uplink data to the base station through uplink resources corresponding to the UE in the special subframe.

As for the UE according to this embodiment, since the position of the downlink resources corresponding to the UE in the GP resources of the special subframe is staggered from the position of the uplink resources corresponding to a UE2 in the special subframe, therefore, when data are transmitted through the special subframe, and the uplink data sent in the special subframe by the UE2 cannot cause interference on the downlink data received by the UE through the GP resources of the special subframe, and as such it can effectively eliminate interference between UEs caused by different RTTs.

Where, the position of the downlink resources corresponding to the UE in the GP resources of the special subframe is staggered from the position of uplink resources corresponding to a UE2 in the special subframe, including: a time of the uplink resources corresponding to the UE2 of the special subframe is after a time of receiving, by the UE, downlink data sent through the GP resources of the special subframe; or A frequency of the downlink resources corresponding to the UE in the GP resources of the special subframe is orthogonal to a frequency of uplink resources corresponding to the UE2 in the special subframe.

Another embodiment of the present disclosure also discloses a communication system, including the UE and the base station described above.

It should be noted that, although embodiments of the present disclosure take an LTE TDD wireless communication system as an example, but the present disclosure is not limited thereto, embodiments of the present disclosure are also applicable to a TDD system, such as WiMAX, TD-SCDMA. Furthermore, when embodiments of the present disclosure are applicable to other wireless communication system, and name of guard period GP interval resources for the uplink transmission and the downlink transmission in the embodiments of the present disclosure may be changed, for example, it can be called as a round-trip time guard period, the present disclosure is not limited to the name of GP resources, and they shall also fall in the scope of the present disclosure.

Persons skilled in the art can clearly know that, for convenience and brevity of description, the detailed working procedures of the systems, devices, and units described above can refer to the corresponding procedures in the method embodiments, and are not repeated herein.

Understandably, in the embodiments described herein, the disclosed systems, devices and methods may be implemented in other modes. For example, the device embodiments above are illustrative in nature, and the units of the device are defined from the perspective of logical functions only and may be defined in a different way in practical application. For example, multiple units or components may be combined or integrated into another system, or some features may be ignored or not executed. Besides, the coupling, direct coupling or communication connection illustrated or discussed herein may be implemented through indirect coupling or communication connection between interfaces, devices or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present disclosure.

Besides, all functional units in the embodiments of the present disclosure may be physically stand-alone, or integrated into a processing module, or two or more of the units are integrated into one unit. The integrated unit may be implemented in a manner of a hardware or a software function unit.

If being implemented as a software function unit and sold or used as a stand-alone product, the integrated unit may be stored in a computer-readable storage medium. Therefore, the essence of the technical solution of the present disclosure, or its contribution to the prior art, or all or part of the technical solution, may be embodied in a software product. The computer software product may be stored in a storage medium and incorporate several instructions for instructing a computer device (for example, personal computer, server, or network device) to execute all or part of the steps of the method specified in any embodiment of the present disclosure. Examples of the storage medium include various media capable of storing program codes, such as a USB flash disk, a mobile hard disk, a read-only memory (ROM, Read-Only Memory), a random access memory (RAM, Random Access Memory), a magnetic disk, or an optical disk.

Finally, it should be noted that the above embodiments are merely provided for describing the technical solutions of the present disclosure, but not intended to limit the present disclosure. It should be understood by persons skilled in the art that although the present disclosure has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from scope of the embodiments of the present disclosure.

What is claimed is:

1. A system for transmitting data, comprising: a first user equipment (UE) and a base station, wherein, the first user equipment is configured to receive downlink data from the base station in downlink resources of a subframe; wherein, the first user equipment is configured to acquire a position of uplink resources corresponding to the first user equipment in guard period resources of the subframe, wherein the position of the uplink resources corresponding to the first user equipment in the guard period resources of the subframe is staggered from a position of the downlink resources corresponding to a second user equipment in the subframe, and a round-trip time of the second user equipment is greater than a round-trip time of the first user equipment; and wherein, the first user equipment is configured to send uplink data to the base station through the uplink resources corresponding to the first user equipment in the guard period resources of the subframe; and the base station is configured to send the downlink data through the downlink resources of the subframe to the first user equipment, and to receive the uplink data from the first user equipment through the uplink resources corresponding to the first user equipment in the guard period resources of the subframe.

2. The system according to claim 1, wherein,
the base station is further configured to obtain the round-trip time of the first user equipment and the round-trip time of the second user equipment; and configured to determine, according to the round-trip time of the first user equipment and the round-trip time of the second user equipment, the position of uplink resources corresponding to the first user equipment in guard period resources of the subframe; and
the base station is further configured to send, to the first user equipment, a notification of the position of the uplink resources corresponding to the first user equipment in the guard period resources of the subframe.

3. The system according to claim 1, wherein the position of the uplink resources corresponding to the first user equipment in the guard period resources of the subframe is staggered from the position of the downlink resources corresponding to the second user equipment in the subframe comprises one of:
a time of the uplink resources corresponding to the first user equipment in the guard period resources of the subframe is after a time of receiving, by the second user equipment, downlink data sent through the subframe; and
a frequency of the uplink resources corresponding to the first user equipment in the guard period resources of the subframe is orthogonal to a frequency of the downlink resources corresponding to the second user equipment in the subframe.

4. The system according to claim 1, wherein the base station is further configured to obtain a location of resources which are in the guard period resources of the subframe and interfered by downlink data of a neighboring base station, and to shield the interfered guard period resources or jointly schedule the interfered guard period resources with the neighboring base station.

5. The system according to claim 4, wherein,
if the base station is configured to shield the interfered guard period resources, the base station is further configured to send, to a user equipment within an own cell, a notification for indicating the shielded guard period resources.

6. The system according to claim 4, wherein the base station is further configured to increase a sending power of uplink data of a user equipment which transmits the uplink data using the interfered guard period resources or decrease a sending power of the interfering downlink data.

7. The system according to claim 4, wherein the base station is further configured to jointly schedule a first frequency of the interfered guard period resources and a second frequency occupied by the interfering downlink data with the neighboring base station, so that the first frequency is orthogonal to the second frequency.

8. A system for transmitting data, comprising: a base station and a first user equipment;
the base station is configured to obtain a round-trip time of the first user equipment and a round-trip time of a second user equipment, wherein the round-trip time of the second user equipment is greater than the round-trip time of the first user equipment; and the base station is configured to determine, according to the round-trip time of the first user equipment and the round-trip time of the second user equipment, a position of downlink resources corresponding to the first user equipment in guard period resources of the subframe, wherein the position of the downlink resources corresponding to the first user equipment in the guard period resources of the subframe is staggered from a position of uplink resources corresponding to the second user equipment in the subframe; and the base station is configured to send, to the first user equipment, downlink data through the downlink resources corresponding to the first user equipment in the guard period resources of the subframe; and the first user equipment is configured to send uplink data to the base station through uplink resources corresponding to the first user equipment in the subframe, and receive the downlink data sent from the base station through the downlink resources corresponding to the first user equipment in the guard period resources of the subframe.

9. The system according to claim 8, wherein the position of the downlink resources corresponding to the first user equipment in the guard period resources of the subframe is staggered from the position of the uplink resources corresponding to the second user equipment in the subframe comprises one of:

a time of the uplink resources corresponding to the second user equipment of the subframe is after a time of receiving, by the first user equipment, downlink data sent through the guard period resources of the subframe; and a frequency of the downlink resources corresponding to the first user equipment in the guard period resources of the subframe is orthogonal to a frequency of the uplink resources corresponding to the second user equipment in the subframe.

10. The system according to claim 8, wherein the base station is further configured to obtain a location of resources which are in the guard period resources of the subframe and interfere with uplink data of a neighboring base station, and shield the interfering guard period resources or jointly schedule an interference with the neighboring base station.

11. The system according to claim 10, wherein if the base station is configured to shield the interfered guard period resources, the base station is further configured to send, to a user equipment within an own cell, a notification for indicating a location of the shielded guard period resources.

12. The system according to claim 10, wherein the base station is further configured to decrease a sending power of downlink data of a user equipment which transmits the downlink data using the interfering guard period resources or increase a sending power of the interfered uplink data.

13. The system according to claim 10, wherein the base station is further configured to jointly schedule a first frequency of the interfering guard period resources and a second frequency occupied by the interfered uplink data with the neighboring base station, so that the first frequency is orthogonal to the second frequency.

14. A non-transitory machine-readable storage medium having stored thereon a computer program comprising at least one code section for distributing data, the at least one code section being executable by a first user equipment for causing the first user equipment to perform acts of:

receiving downlink data sent from a base station through downlink resources of a subframe;

acquiring a position of uplink resources corresponding to the first user equipment in guard period resources of the subframe, wherein the position of the uplink resources corresponding to the first user equipment in the guard period resources of the subframe is staggered from a position of downlink resources corresponding to a second user equipment in the subframe, and a round-trip time of the second user equipment is greater than a round-trip time of the first user equipment; and sending uplink data to the base station through the uplink resources corresponding to the first user equipment in the guard period resources of the subframe.

15. The non-transitory machine-readable storage medium of claim 14, wherein the at least one code section being executable by the first user equipment further causes the first user equipment to perform further acts of:

receiving a notification of the position of the uplink resources corresponding to the first user equipment in the guard period resources of the subframe, sent from the base station;

acquiring the position of the uplink resources corresponding to the first user equipment in the guard period resources of the subframe, according to the notification;

acquiring the position of the uplink resources corresponding to the first user equipment in the guard period resources of the subframe, according to the round-trip time of the first user equipment and the round-trip time of the second user equipment; and acquiring the position of the uplink resources corresponding to the first user equipment in the guard period resources of the subframe, according to a preset value.

16. The non-transitory machine-readable storage medium of claim 14, wherein the position of the uplink resources corresponding to the first user equipment in the guard period resources of the subframe is staggered from the position of the downlink resources corresponding to the second user equipment in the subframe comprises one of:

a time of the uplink resources corresponding to the first user equipment in the guard period resources of the subframe is after a time of receiving, by the second user equipment, downlink data sent through the subframe; and a frequency of the uplink resources corresponding to the first user equipment in the guard period resources of the subframe is orthogonal to a frequency of the downlink resources corresponding to the second user equipment in the subframe.

17. The non-transitory machine-readable storage medium of claim 14, wherein, the guard period resources are divided into a first half of the guard period resources and a second half of the guard period resources in terms of time, the uplink resources corresponding to the first user equipment in the guard period resources of the subframe are in the second half of the guard period resources in terms of time, a duration of the second half of the guard period resources is less than or equal to half of a duration of the guard period resources, or is less than or equal to a difference between the duration of the guard period resources and half a duration of a maximum round-trip time corresponding to a set of user equipments, and the set of the user equipments comprise the first user equipment and the second user equipment.

18. A non-transitory machine-readable storage medium having stored thereon a computer program comprising at least one code section for distributing data, the at least one code section being executable by a base station for causing the base station to perform acts of:

sending downlink data through downlink resources of a subframe to a first user equipment; and receiving uplink data sent from the first user equipment through uplink resources corresponding to the first user equipment in guard period resources of the subframe, wherein a position of the uplink resources corresponding to the first user equipment in the guard period resources of the subframe is staggered from a position of downlink resources corresponding to a second user equipment in the subframe, and a round-trip time of the second user equipment is greater than a round-trip time of the first user equipment.

19. The non-transitory machine-readable storage medium of claim 18, wherein the at least one code section being executable by the base station further causes the base station to perform further acts of:
obtaining the round-trip time of the first user equipment and the round-trip time of the second user equipment;
determining, according to the round-trip time of the first user equipment and the round-trip time of the second user equipment, the position of the uplink resources corresponding to the first user equipment in guard period resources of the subframe; and
sending a notification of the position of the uplink resources corresponding to the first user equipment in the guard period resources of the subframe to the first user equipment.

20. The non-transitory machine-readable storage medium of claim 18, wherein the position of the uplink resources corresponding to the first user equipment in the guard period resources of the subframe is staggered from the position of the downlink resources corresponding to the second user equipment in the subframe comprises one of:
a time of the uplink resources corresponding to the first user equipment in the guard period resources of the subframe is after a time of receiving, by the second user equipment, downlink data sent through the subframe; and
a frequency of the uplink resources corresponding to the first user equipment in the guard period resources of the subframe is orthogonal to a frequency of the downlink resources corresponding to the second user equipment in the subframe.

21. The non-transitory machine-readable storage medium of claim 18, wherein the at least one code section being executable by the base station further causes the base station to perform further acts of:
obtaining a location of resources which are in the guard period resources of the subframe and interfered by downlink data of a neighboring base station; and
shielding the interfered guard period resources or jointly scheduling an interference with the neighboring base station.

22. The non-transitory machine-readable storage medium of claim 21, wherein the at least one code section being executable by the base station further causes the base station to perform a further act of:
sending a notification for indicating a location of the shielded guard period resources to a user equipment within an own cell.

23. The non-transitory machine-readable storage medium of claim 21, wherein the at least one code section being executable by the base station further causes the base station to perform further acts of:
increasing a sending power of uplink data of a user equipment which transmits the uplink data using the interfered guard period resources or decreasing a sending power of the interfering downlink data; and
jointly scheduling a first frequency of the interfered guard period resources and a second frequency occupied by the interfering downlink data with the neighboring base station, so that the first frequency is orthogonal to the second frequency.

24. A non-transitory machine-readable storage medium having stored thereon a computer program comprising at least one code section for distributing data, the at least one code section being executable by a base station for causing the base station to perform acts of:
obtaining a round-trip time of a first user equipment and a round-trip time of a second user equipment, wherein the round-trip time of the second user equipment is greater than the round-trip time of the first user equipment;
determining, according to the round-trip time of the first user equipment and the round-trip time of the second user equipment, a position of downlink resources corresponding to the first user equipment in guard period resources of a subframe, so that the position of the downlink resources corresponding to the first user equipment in the guard period resources of the subframe is staggered from a position of uplink resources corresponding to the second user equipment in the subframe; and
sending, to the first user equipment, downlink data through the downlink resources corresponding to the first user equipment in the guard period resources of the subframe.

25. The non-transitory machine-readable storage medium of claim 24, wherein the position of the downlink resources corresponding to the first user equipment in the guard period resources of the subframe is staggered from the position of the uplink resources corresponding to the second user equipment in the subframe comprises one of:
a time of the uplink resources corresponding to the second user equipment of the subframe is after a time of receiving, by the first user equipment, downlink data sent through the guard period resources of the subframe; and
a frequency of the downlink resources corresponding to the first user equipment in the guard period resources of the subframe is orthogonal to a frequency of the uplink resources corresponding to the second user equipment in the subframe.

26. The non-transitory machine-readable storage medium of claim 24, wherein the at least one code section being executable by the base station further causes the base station to perform further acts of:
obtaining a location of resources which are in the guard period resources of the subframe and interfere in uplink data of a neighboring base station; and
shielding the interfering guard period resources or jointly scheduling an interference with the neighboring base station.

27. The non-transitory machine-readable storage medium of claim 26, wherein the at least one code section being executable by the base station further causes the base station to perform a further act of:
sending, to a user equipment within an own cell, a notification for indicating a location of the shielded guard period resources.

28. The non-transitory machine-readable storage medium of claim 26, wherein the at least one code section being executable by the base station further causes the base station to perform further acts of:
decreasing a sending power of downlink data of a user equipment which transmits the downlink data using the interfering guard period resources and/or increasing a sending power of the interfered uplink data; and
jointly scheduling a first frequency of the interfering guard period resources and a second frequency occupied by the interfered uplink data with the neighboring base station, so that the first frequency is orthogonal to the second frequency.

29. A non-transitory machine-readable storage medium having stored thereon a computer program comprising at least one code section for distributing data, the at least one code section being executable by a first user equipment for causing the first user equipment to perform acts of:

receiving downlink data sent from a base station through downlink resources corresponding to the first user equipment in guard period resources of a subframe, wherein a position of the downlink resources corresponding to the first user equipment in the guard period resources of the subframe is staggered from a position of uplink resources corresponding to a second user equipment in the subframe, and a round-trip time of the second user equipment is greater than a round-trip time of the first user equipment; and sending uplink data to the base station through uplink resources corresponding to the first user equipment in the subframe.

30. The non-transitory machine-readable storage medium of claim 29, wherein the position of the downlink resources corresponding to the first user equipment in the guard period resources of the subframe is staggered from the position of the uplink resources corresponding to the second user equipment in the subframe comprises one of:

a time of the uplink resources corresponding to the first user equipment in the guard period resources of the subframe is after a time of receiving, by the second user equipment, downlink data sent through the subframe; and a frequency of the downlink resources corresponding to the first user equipment in the guard period resources of the subframe is orthogonal to a frequency of the uplink resources corresponding to the second user equipment in the subframe.

* * * * *